| United States Patent [19] | [11] Patent Number: 4,599,764 |
| Knepshield | [45] Date of Patent: Jul. 15, 1986 |

[54] CASING RING DEVICE

[75] Inventor: Thomas R. Knepshield, Kenosha, Wis.

[73] Assignee: Vista International Packaging, Inc., Kenosha, Wis.

[21] Appl. No.: 637,481

[22] Filed: Aug. 3, 1984

[51] Int. Cl.$^4$ .............................................. A22C 11/02
[52] U.S. Cl. .......................................... 17/41; 17/1 R
[58] Field of Search .............. 17/1 R, 41, 42; 53/576, 53/567

[56] References Cited

U.S. PATENT DOCUMENTS 3,975,795  8/1976  Kupcikevicius .......................... 17/41
4,512,059  4/1985  Beckman ............................. 17/41 X

FOREIGN PATENT DOCUMENTS 0068342  1/1983  European Pat. Off. ................ 17/41
523679   9/1976  U.S.S.R. ................................. 17/41

Primary Examiner—Willie G. Abercrombie
Assistant Examiner—Steven P. Weihrouch
Attorney, Agent, or Firm—Herman H. Bains

[57] ABSTRACT

A casing ring device is mounted on the end of a stuffing horn of a stuffing machine and is positioned so that the shirred casing passes over the ring during the stuffing operation. The casing ring device includes a ring member formed of a metallic material with means thereon for releasable attachment to the stuffing horn. A sleeve formed of yieldable material embraces the ring member and includes a tapered forward portion which projects into the conventional brake ring and cooperates therewith to retard movement of the casing during the stuffing operation.

1 Claim, 7 Drawing Figures

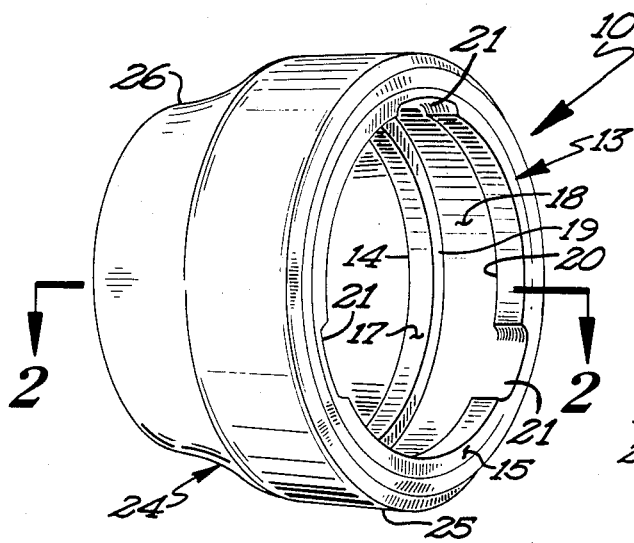
Fig. 1
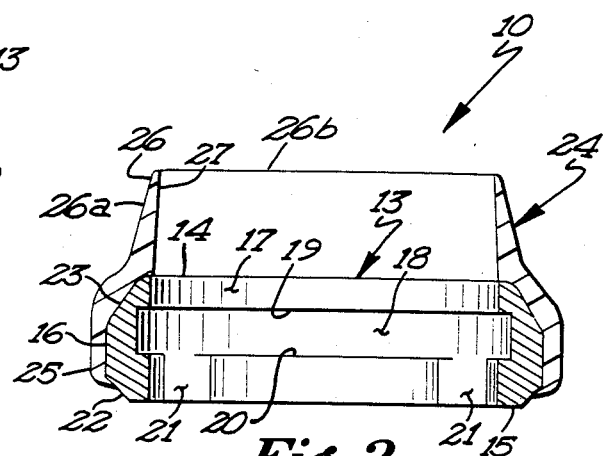
Fig. 2
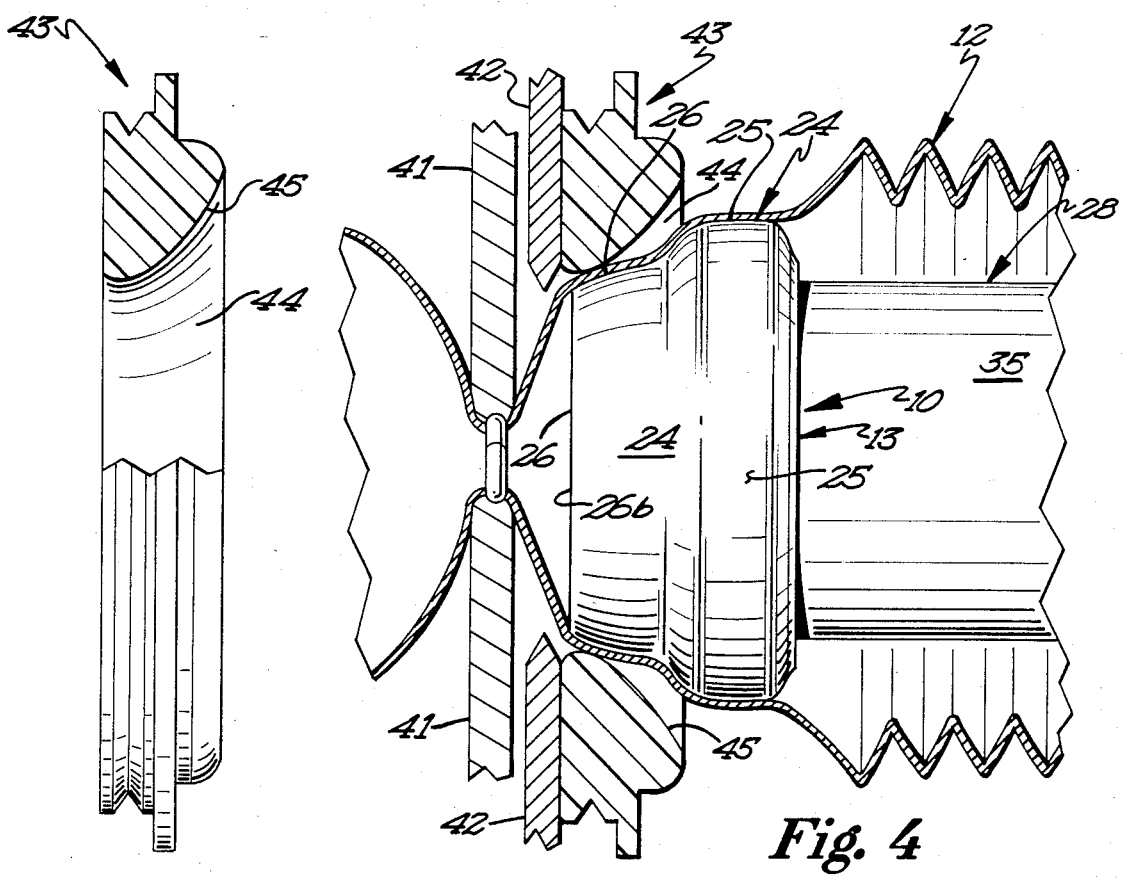
Fig. 3
Fig. 4

CASING RING DEVICE

This invention relates to a casing ring device used with a stuffing machine which extrudes food product into a casing.

SUMMARY OF THE INVENTION

Commercial stuffing machines are used to extrude food product, such as sausage emulsion, cheese and the like, into an elongate shirred casing. Typically, the food product is extruded in a shirred casing under high pressure and it is necessary to apply some means for retarding movement of the casing as it is being filled.

In U.S. Pat. Nos. 4,007,761 and Re 30,265, a disposable rigid plastic ring is inserted into one end portion of the casing and is mounted on the stuffing horn. The plastic ring is larger in diameter than the casing and serves to retard movement of the casing as it is pulled over the ring in the stuffing operation. These rings are sold as a component of the casing package and are intended to be disposed after a single use.

There are many types of casings which do not contain a disposable plastic ring as a component thereof. Further, the inclusion of the plastic ring necessarily increases the cost of the casing package.

It is therefore a general object of this invention to provide a casing ring device for a stuffing machine which cooperates with the brake ring component of the stuffing machine to effectively retard movement of the casing during the stuffing operation.

It is another object of this invention to provide a novel casing ring for a stuffing machine which retards movement of the casing and which may be readily removed from the stuffing machine for cleaning, repair, and the like, and which may be readily reapplied to the stuffing machine for subsequent use thereof.

FIGURES OF THE DRAWING

FIG. 1 is a perspective view of the novel casing ring device;

FIG. 2 is a cross-sectional view taken approximately along line 2—2 of FIG. 1 and looking in the direction of the arrows;

FIG. 3 is a side view of a commercial brake ring with parts thereof broken away for clarity;

FIG. 4 is a cross-sectional view of the novel casing ring illustrated in mounted relation on a stuffing horn and further illustrating the conventional snubbing mechanism, which is a component of a stuffing apparatus;

DESCRIPTION OF THE PREFERRED EMBODIMENT

Figure 5:
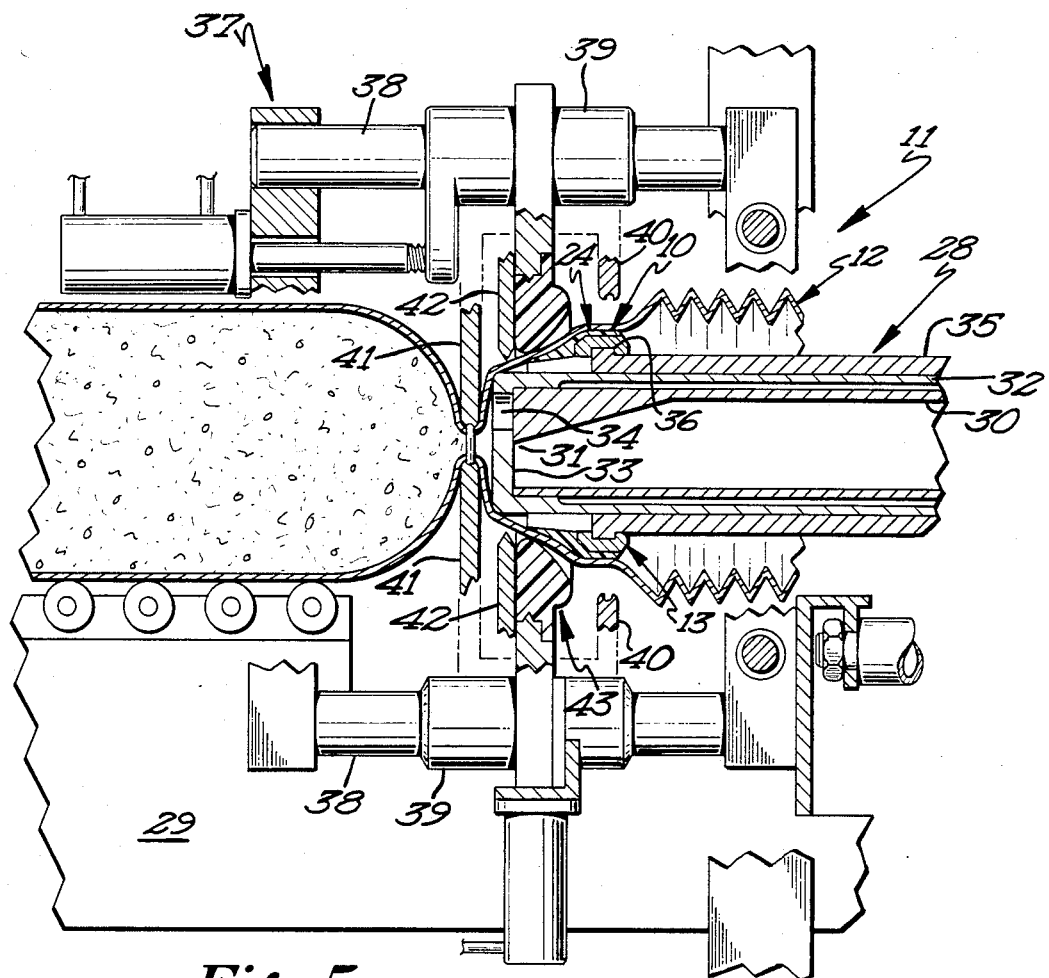
FIG. 5 is a side view partly in section and partly in elevation of a portion of a conventional stuffing machine and snubbing mechanism illustrating the manner in which the casing ring is used.
Figure 6:
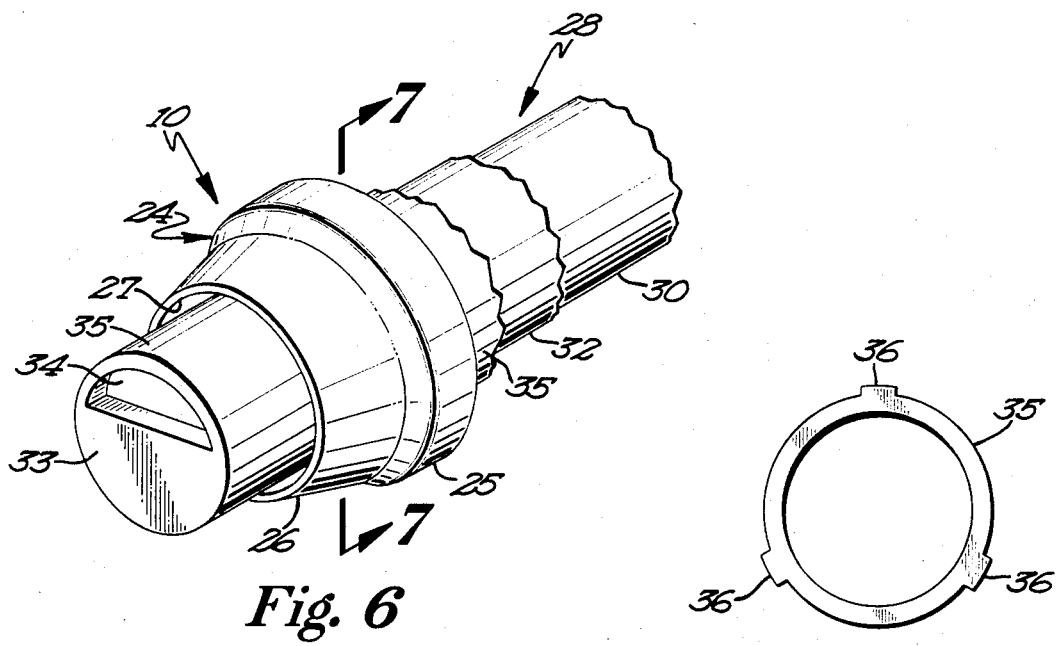
FIG. 6 is a perspective view of a stuffing horn having the novel casing ring mounted thereon with certain parts thereof broken away for clarity.
Figure 7:
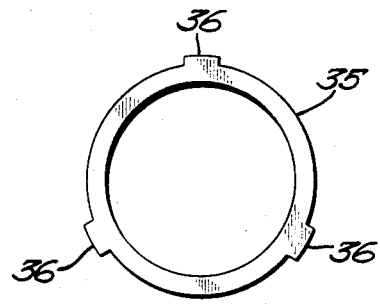
FIG. 7 is a cross-sectional view taken approximately along line 7—7 of FIG. 6 and looking in the direction of the arrows.

Referring now to the drawings and more specifically to FIGS. 1 and 5, it will be seen that one embodiment of the novel casing ring device, designated generally by the reference numeral 10, is thereshown. Specifically, in FIG. 5, the casing ring device 10 is illustrated in mounted cooperating relation on a stuffing machine 11 which is operable to stuff a conventional shirred casing 12 with a food product, such as a sausage emulsion or the like.

Referring now to FIGS. 1 and 2, it will be seen that the casing ring device 10 includes an annular or ring member 13 which is formed of a rigid metallic material, preferably stainless steel or the like. The ring member 13 has a substantially flat annular front end 14 and a substantially flat annular rear end 15. The interior surface 17 of the ring member has an enlarged recess 18 therein which is spaced from the front and rear ends of the ring member to thereby define a front shoulder 19 and a rear shoulder 20. The enlarged recess 18 has a diameter slightly larger than the diameter defined by the remaining interior surface portion of the ring member.

Referring again to FIGS. 1 and 2, it will be seen that the interior surface 17 of the ring member 13 has a pair of slots 21 therein which extend from the rear end 15 thereof through the rear shoulder 20 to communicate with the enlarged recess 18. It will further be noted that the slots 21 are circumferentially spaced apart and are adapted to slip over the locking lugs of the stuffing horn in a manner to be described hereinbelow. It will also be noted that the exterior surface 16 of the ring member 14 has a rear sloped or beveled portion 22 and a front sloped or beveled portion 23.

The ring device 10 also includes a sleeve 24 which is formed of a yieldable flexible material, such as rubber, plastic, or the like. The sleeve 24 includes a ring member engaging portion 25 and a front portion 26, as best seen in FIG. 2. In the embodiment shown, the ring member engaging portion 25 extends around the exterior surface 16 of the ring member, but does not cover the rear sloped exterior surface portion 22 thereof. The ring member engaging portion 25 does cover the front sloped portion 23 of the exterior surface of the ring member, as best seen in FIG. 2. The exterior surface 26a of the front portion 26 is tapered towards the front end edge 26b of the sleeve so that the sleeve generally tapers towards the front end of the casing ring device. Although the inner surface 27 of the front portion 26 is slightly tapered towards the front end, in general, the front interior surface of the sleeve 24 is generally coextensive with the interior surface of the ring member 13.

The stuffing machine 11 is of conventional construction and includes a telescoping stuffing horn 28 of well-known construction. The stuffing horn 28 is mounted on a support frame 29 and includes an inner support tube 30 which has a tapered discharge port 31 at its forward end. The support tube 30 is positioned interiorly of a cut-off tube 32 which is concentrically arranged with respect to the support tube 30 and which is provided with an end wall 33 at its forward end that defines a semi-circular orifice 34. The cut-off tube 32 is adapted to rotate relative to the support tube 30 in a known manner so that the discharge orifice 34 may be selectively opened and closed. It will be appreciated that, during the stuffing cycle, the orifice 34 of the cut-off tube is repositioned so that it is in registry with the discharge port 31 of the inner support tube. However, at the end of the stuffing cycle, the cut-off tube will rotate about its longitudinal axis so that the discharge port 31 of the support tube will be obstructed by the end wall 33.

The stuffing horn 28 also includes an elongate support sleeve 35 which is positioned concentrically around the cutoff tube 32 and is slidable thereon in a fore and aft longitudinal direction. The front end of the support sleeve 35 is provided with a plurality of circumferentially spaced apart locking lugs 36 which project outwardly therefrom. It will be seen that the casing ring device 10 is mounted on the support sleeve 35 by aligning the locking lugs 36 with the slots 21 to permit the locking lugs to pass through the slots and allow the casing ring to be rotated so that the locking lugs are locked in the enlarged recess 18 of the ring member 13. When so positioned, the casing ring will project forwardly from the support sleeve 35, as best seen in FIG. 5.

The stuffing machine 11 also includes a snubbing carriage 37 which is adapted to apply a leading clip to the front end portion of the casing and is also adapted to apply a trailing clip after the stuffing operation has been completed and leading clip to the successive portion of the casing to be filled. A severing blade assembly mounted on the snubbing carriage severs the casing between the trailing and leading clips. The stuffing apparatus, including the snubbing carriage, is all well-known construction in various commercial stuffing machines. The snubbing carriage includes slide bearings 39 which are slidable towards and away from the stuffing horn 28 on slide rods 38. The snubbing carriage 37 is provided with a leading clip closing mechanism 40 and a trailing clip closing mechanism 41. A severing knife 42 is also mounted on the snubbing carriage as a component thereof. It will be appreciated that the leading clip closing mechanism 40 applies a clip to the leading portion of the casing 12 to close the end of the casing for the beginning of the extrusion cycle. The trailing clip closing mechanism 41 applies a clip to the rear end portion of the stuffing casing just prior to the severance of the casing by the severing knife assembly 42.

The snubbing carriage 37 also includes a brake ring 43, which is mounted thereon and through which the casing 12 extends during the stuffing operation. The brake ring 43 has a tapered opening 44 therethrough which is defined by a tapered surface 45. The tapered surface extends in a rear to front direction, as best seen in FIGS. 3, 4, and 5.

During operation of the stuffing machine 11, the machine is actuated so that the snubbing carriage 37 is advanced toward the stuffing horn. The support sleeve 35 is retracted relative to the cut-off tube 32 and the latter is rotated to align the orifice 34 with the discharge port 31 of the inner support tube. When the apparatus is in this condition, the casing 12 extends over the casing ring device 10, as best seen in FIGS. 4 and 5. It will be appreciated that a clip will have been applied to the open front end of the casing 12 by the leading clip closing mechanism 40.

The stuffing operation will begin and the emulsified product will be forced through the stuffing tube at high pressure to continuously stuff the shirred casing 12 in a well-known manner. The casing 12 will pass over the surface of the sleeve 24 of the casing ring device 10 and against the tapered surface 45 of the brake ring 43. The interaction of the yieldable flexible sleeve of the casing ring device 10 with the brake ring serves to provide a retarding effect on the casing during the high pressure filling thereof. It will be noted that the exterior diameter of the casing ring device 10 is less than the interior diameter of the casing.

At the end of the stuffing cycle, the snubbing carriage is retracted in a direction away from the stuffing horn. When the snubbing carriage reaches its retracted position, the leading end clip closing mechanism will be actuated to apply a clip to the open end of the unfilled casing 12. Thereafter, the severing knife assembly will be actuated by suitable controls so that the portion of the casing rotated between the trailing clip and the leading clip will be severed. The cut-off tube will have been rotated to close the discharge port 31 on the inner support tube 30. The support sleeve 46 will have been advanced to its starting position at the end of the stuffing cycle. As pointed out above, the unique casing ring device 10 is useable with various kinds of stuffing machines and the various components of the stuffing machines do not, per se, form a part of the present invention.

The casing ring device 10 may be removed from the stuffing horn for cleaning or repair, but is useable over and over again, unlike the disposable plastic rings used as a component of a certain commercial casing package. Further, the use of a flexible yieldable sleeve minimizes danger of damage to the casing during the stuffing operation.

Finally, the use of a yieldable flexible sleeve mounted on a rigid metallic ring member provides an optimum material for producing the effective retarding action of the casing with the brake ring during the high pressure stuffing operation.

From the foregoing, it will be seen that I have provided a novel casing ring device which is not only of simple and inexpensive construction, but one that functions in a more efficient manner than any heretofore known comparable device.

What is claimed is:

1. A ring device adapted to be mounted adjacent the discharge end of a stuffing horn for a stuffing machine used to stuff casings with food product and over which the casing passes, the stuffing horn having circumferentially spaced apart locking lugs projecting outwardly therefrom, a snubbing device for applying clips to the casing and having a rigid annular brake ring through which the stuffing horn projects during the stuffing operation, comprising:

a ring member having a front end and a rear end and being formed of a metallic material, said ring member having a generally circular interior surface, an enlarged interior annular recess in said interior surface spaced from the front and rear ends thereof to define front and rear annular shoulders, a plurality of circumferentially spaced apart slots in said front shoulder communicating with said annular recess to permit the slots to pass over the locking lugs on the stuffing horn whereby, when the ring is rotated, the ring device will be releasably locked on the stuffing horn, a sleeve formed of flexible yieldable material and including a ring member engaging portion and a forward portion, said ring member engaging portion embracing the exterior surface of said ring member and said forward portion extending axially forwardly from said ring member and said ring member engaging portion, the exterior surface of said forward portion tapering axially from said ring member and ring member engaging portion, and the interior surface of said forward portion having a diameter corresponding generally to the inner diameter of said ring member, said ring member engaging portion of said sleeve having an exterior diameter less than the diameter of the casing to be filled whereby the casing being moved over said ring device and through the brake ring during the stuffing operation will be retarded by the yieldable sleeve as the sleeve yieldably urges the casing against the brake ring during the stuffing operation.

* * * * *